(12) United States Patent
Otani et al.

(10) Patent No.: US 9,794,535 B2
(45) Date of Patent: Oct. 17, 2017

(54) DISPLAY DEVICE

(71) Applicant: SEIKO EPSON CORPORATION, Tokyo (JP)

(72) Inventors: Makoto Otani, Matsumoto (JP); Akitaka Yajima, Tatsuno-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/032,803

(22) PCT Filed: Nov. 21, 2014

(86) PCT No.: PCT/JP2014/005867
§ 371 (c)(1),
(2) Date: Apr. 28, 2016

(87) PCT Pub. No.: WO2015/075945
PCT Pub. Date: May 28, 2015

(65) Prior Publication Data
US 2016/0286180 A1    Sep. 29, 2016

(30) Foreign Application Priority Data
Nov. 22, 2013 (JP) ................................ 2013-241620

(51) Int. Cl.
*H04N 9/64* (2006.01)
*H04N 9/31* (2006.01)
(Continued)

(52) U.S. Cl.
CPC ......... *H04N 9/3155* (2013.01); *G03B 21/005* (2013.01); *G03B 21/208* (2013.01); *H04N 9/3102* (2013.01); *H04N 9/3152* (2013.01)

(58) Field of Classification Search
USPC ....... 348/744, 725, 750, 758, 759, 761, 771, 348/781, 801, 839, 842, 309, 332, 227.1,
(Continued)

(56) References Cited

U.S. PATENT DOCUMENTS 5,245,253 A  *  9/1993 Quazi ................ H05B 41/2925
                                                                 315/224
6,891,672 B2    5/2005 Whitehead et al.
(Continued)

FOREIGN PATENT DOCUMENTS

CN     1838220 A     9/2006
EP     0829747 A1    3/1998
(Continued)

OTHER PUBLICATIONS

Jan. 13, 2015 International Search Report issued in International Patent Application No. PCT/JP2014/005867.
(Continued)

*Primary Examiner* — Jefferey F Harold
*Assistant Examiner* — Mustafizur Rahman
(74) *Attorney, Agent, or Firm* — Oliff PLC

(57) ABSTRACT

A light modulation device having an image forming area in which a plurality of pixels is arranged, and adapted to modulate incident light, and an illumination device adapted to illuminate the image forming area are provided, and the illumination device has an effective dimming area in which a plurality of dimming parts each capable of individually controlling a light intensity of the light for illuminating the image forming area is arranged, illumination areas illuminated by the light emitted from the dimming parts adjacent to each other out of the plurality of dimming parts partially overlap each other, and the light enters the light modulation device, and the position of the peak of the intensity distribution of the light emitted from the dimming part located on
(Continued)

the outermost side of the effective dimming area is located on the outer edge of the image forming area or outside the image forming area.

11 Claims, 12 Drawing Sheets

(51) Int. Cl.
 *G03B 21/20* (2006.01)
 *G03B 21/00* (2006.01)
(58) Field of Classification Search
 USPC ...... 348/230.1, 272, 294, 297, 132, 131, 70, 348/68, 34; 345/76, 82, 102, 204, 211, 345/690, 698; 353/30, 31, 37, 29, 34, 49, 353/89
 See application file for complete search history.

(56) References Cited

U.S. PATENT DOCUMENTS

| | | | |
|---|---|---|---|
| 9,113,513 B1* | 8/2015 | Jungwirth | H05B 33/0815 |
| 2003/0210257 A1* | 11/2003 | Hudson | G09G 3/3648 |
| | | | 345/692 |
| 2004/0095558 A1 | 5/2004 | Whitehead et al. | |
| 2004/0212321 A1* | 10/2004 | Lys | H05B 33/0809 |
| | | | 315/291 |
| 2004/0223129 A1* | 11/2004 | Ishikawa | G03B 27/54 |
| | | | 355/53 |
| 2006/0214904 A1 | 9/2006 | Kimura et al. | |
| 2007/0229718 A1 | 10/2007 | Hall | |
| 2008/0100645 A1* | 5/2008 | Nitta | G09G 3/3426 |
| | | | 345/690 |
| 2010/0141177 A1* | 6/2010 | Negrete | H05B 33/0845 |
| | | | 315/297 |
| 2010/0171927 A1* | 7/2010 | Kitano | G02B 26/06 |
| | | | 353/20 |
| 2010/0231501 A1* | 9/2010 | Mun | G02B 6/0055 |
| | | | 345/102 |
| 2010/0253231 A1* | 10/2010 | DeVincentis | H01J 65/044 |
| | | | 315/158 |
| 2011/0175543 A1* | 7/2011 | Sun | H05B 33/0818 |
| | | | 315/291 |
| 2011/0298842 A1 | 12/2011 | Destain | |
| 2012/0113239 A1* | 5/2012 | Krupnik | A61B 1/00009 |
| | | | 348/65 |
| 2012/0249895 A1* | 10/2012 | Kaifu | H04N 5/238 |
| | | | 349/1 |
| 2012/0327136 A1* | 12/2012 | Uehara | G02F 1/133603 |
| | | | 345/690 |
| 2013/0141699 A1* | 6/2013 | Yamamoto | G03B 21/206 |
| | | | 353/31 |
| 2014/0043374 A1* | 2/2014 | Yanai | G03B 21/16 |
| | | | 345/690 |
| 2014/0081083 A1* | 3/2014 | Morita | A61B 1/0646 |
| | | | 600/109 |
| 2014/0333905 A1* | 11/2014 | Sugiyama | G03B 9/02 |
| | | | 353/97 |

FOREIGN PATENT DOCUMENTS

| | | |
|---|---|---|
| EP | 1705636 A1 | 9/2006 |
| JP | 2007-034251 A | 2/2007 |
| JP | 2008-242208 A | 10/2008 |
| JP | 4348409 B2 | 10/2009 |
| JP | 4480763 B2 | 6/2010 |
| JP | 2010-276757 A | 12/2010 |
| WO | 02/069030 A2 | 9/2002 |

OTHER PUBLICATIONS

Jun. 9, 2017 Search Report issued in European Patent Application No. 14864314.1.

* cited by examiner

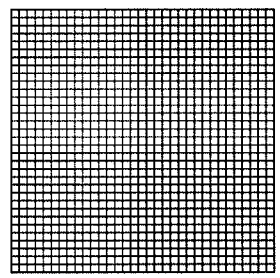 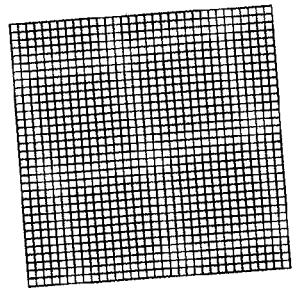 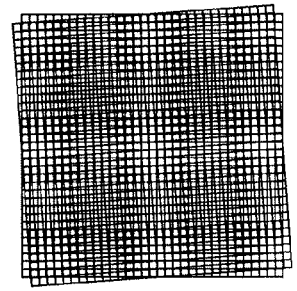
FIG.10A  FIG.10B  FIG.10C
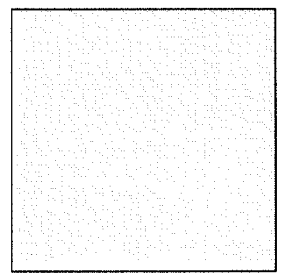 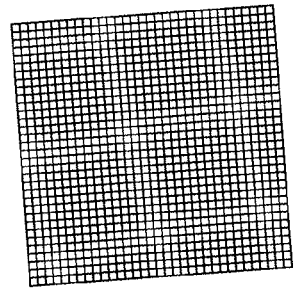 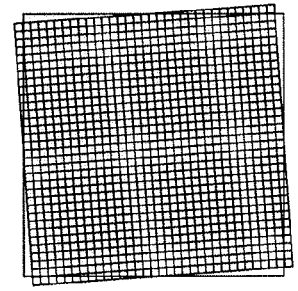
FIG.11A  FIG.11B  FIG.11C

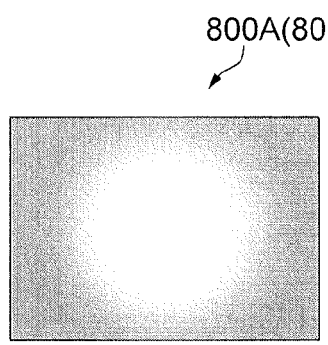 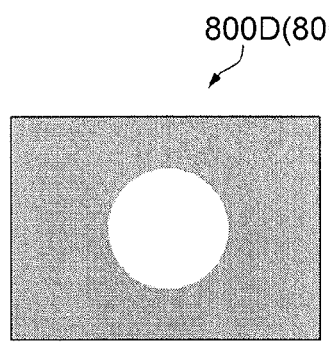 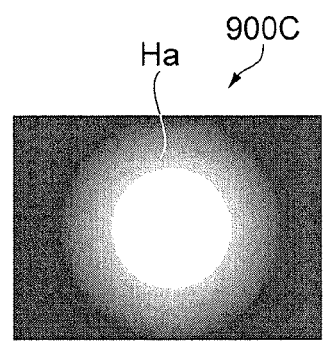
FIG.12A    FIG.12B    FIG.12C
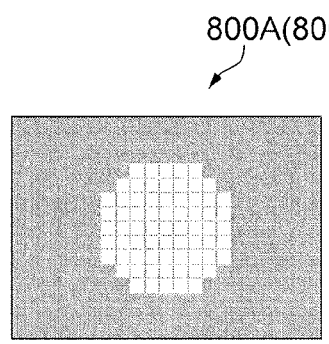 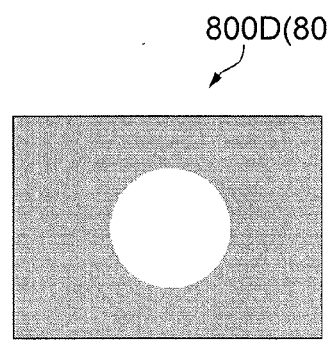 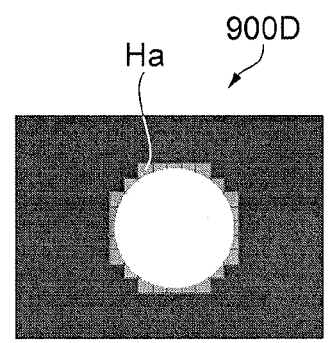
FIG.13A    FIG.13B    FIG.13C
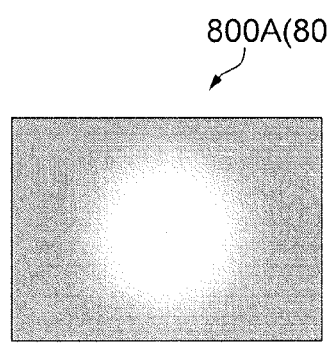 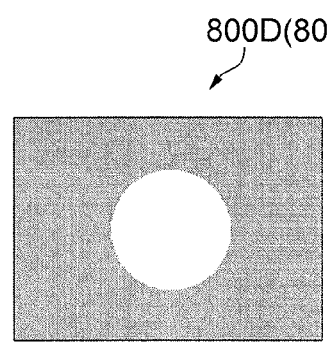 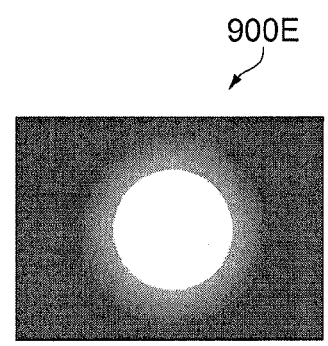
FIG.14A    FIG.14B    FIG.14C

DISPLAY DEVICE

TECHNICAL FIELD

The present invention relates to a display device.

BACKGROUND ART

In the past, there has been known a display device, which modulates the light emitted from the light source using a light modulation device to display an image. Incidentally, in recent years, there has been demanded an improvement in image quality due to increase in contrast of the image to be displayed and expansion of a luminance rage (dynamic range) of the image which can be displayed, in order to achieve the improvement in the image quality, there has been proposed a display device provided with a dimming device, which controls the light intensity of the light from a light source in accordance with image information, disposed on an anterior side in an optical path of the light modulation device (see, e.g., PTL 1).

The display device described in PTL 1 is provided with a light source, a first light modulator (a dimming device), an optical system, and a transmissive projection screen, and the transmissive projection screen is provided with a second light modulator (a light modulation device), and a diffuser.

The first light modulator is provided with a plurality of pixels which can individually be addressed, and has a function of controlling the light intensity by modulating the light from the light source.

The second light modulator is formed so as to be higher in resolution than the first light modulator, and one pixel of the first light modulator corresponds to a plurality of pixels of the second light modulator.

Further, regarding the light from the light source, the light is emitted from the pixel approximating the image in the first light modulator, and is imaged on the second light modulator via the optical system. Then, the light is emitted from the pixel corresponding to the image to be displayed in the second light modulator, and the image is displayed via the diffuser.

CITATION LIST

Patent Literature

PTL 1: Japanese Patent No. 4348409

SUMMARY OF INVENTION

Technical Problem

However, in the display device described in PTL 1, although the light, which has been emitted from the adjacent pixel out of the plurality of pixels in the first light modulator, partially overlaps in the second light modulator, the outer side of the light emitted from the outermost pixel of the area where the plurality of pixels is arranged does not overlap in the second light modulator, after all. In other words, the intensity of the light, with which the end part of the area in which the plurality of pixels is arranged in the second light modulator is irradiated, is decreased. Therefore, in the display device described in PTL 1, there is a problem that the end part of the image displayed becomes dark.

Solution to Problem

The invention is made for solving at least a part of the problem described above, and can be implemented as the following aspects or application examples.

APPLICATION EXAMPLE 1

A display device according to the present application example is a display device provided with a light modulation device having an image forming area in which a plurality of pixels is arranged, and adapted to modulate incident light, and an illumination device adapted to illuminate the image forming area, in which the illumination device has an effective dimming area in which a plurality of dimming parts each capable of individually controlling a light intensity of the light for illuminating the image forming area is arranged, illumination areas illuminated by the light emitted from the dimming parts adjacent to each other out of the plurality of dimming parts partially overlap each other, and the light enters the light modulation device, and a position of a peak of an intensity distribution of the light emitted from the dimming part located on an outermost side of the effective dimming area is located one of on an outer edge of the image forming area and outside the image forming area.

According to this configuration, since the image forming area of the light modulation device is illuminated by the light controlled in light intensity by the plurality of dimming parts, it becomes possible for the display device to improve the contrast ratio, and to display an image with the dynamic range expanded.

Further, since the position of the peak of the intensity distribution of the light emitted from the dimming part located on the outermost side is located on the outer edge of the image forming area or outside the image forming area, it becomes possible to illuminate the image forming area at uniform luminance including the end parts of the image forming area. Therefore, it is possible to inhibit the degradation of the luminance of the end parts in the image displayed.

Therefore, it becomes possible to provide the display device capable of displaying a high-quality image.

APPLICATION EXAMPLE 2

In the display device according to the application example described above, it is preferable that the dimming parts are each configured so as to have a same shape, and in a case of defining a length in a first direction of the image forming area as L1, an interval of the peaks of the intensity distributions in the first direction of the light emitted from the plurality of dimming parts as p1, and a number of the dimming parts in the first direction of the effective dimming area as n1, $p1 \times (n1-1) L1$ is fulfilled.

According to this configuration, it is possible to adopt the configuration in which in the first direction, the position of the peak of the intensity distribution of the light emitted from the dimming part located on the outermost side of the effective dimming area is located on the outer edge of the image forming area or outside the image forming area. Thus, the end parts in the first direction of the image forming area can surely be illuminated at the peak intensity. Therefore, it becomes possible to display an image in which there is suppressed the degradation of the luminance of the end parts of the image in, for example, the horizontal direction or the vertical direction viewed from the observer observing the image.

APPLICATION EXAMPLE 3

In the display device according to the application example described above, it is preferable that in a case of defining a length in a second direction perpendicular to the first direction of the image forming area as L2, an interval of the peaks of the intensity distributions in the second direction of the light emitted from the plurality of dimming parts as p2, and a number of the dimming parts in the second direction of the effective dimming area as n2, p2×(n2−1)L2 is fulfilled.

According to this configuration, it is possible to adopt the configuration in which in the second direction in addition to the first direction, the position of the peak of the intensity distribution of the light emitted from the dimming part located on the outermost side of the effective dimming area is located on the outer edge of the image forming area or outside the image forming area. Therefore, it becomes possible to display an image in which there is suppressed the degradation of the luminance of the end parts of the image in, for example, the horizontal direction and the vertical direction viewed from the observer observing the image.

APPLICATION EXAMPLE 4

In the display device according to the application example described above, it is preferable that a light exit side of the plurality of dimming parts and a light incident side of the image forming area are disposed so as to be opposed to each other, and the effective dimming area is larger than the image forming area in a first direction and a second direction perpendicular to the first direction.

According to this configuration, it is possible to achieve the configuration in which the position of the peak of the intensity distribution of the light emitted from the dimming part located on the outermost side of the effective dimming area is located on the outer edge of the image forming area or outside the image forming area using a simple configuration of forming the effective dimming area to be larger than the image forming area and disposing the plurality of dimming parts and image forming area so as to be opposed to each other. Thus, it becomes possible to realize the display device provided with the illumination device capable of illuminating the image forming area at uniform luminance including the end parts of the image forming area while inhibiting the complicated structure and growth in size of the display device.

APPLICATION EXAMPLE 5

In the display device according to the application example described above, it is preferable that the illumination device is provided with an imaging optical system adapted to image the light emitted from the effective dimming area at a position shifted from the light modulation device in a direction along an optical axis of the light.

There is a limitation in making the plurality of dimming parts and the light modulation devices come close to each other, and further, in the configuration in which the plurality of dimming parts and the light modulation devices need to be cooled, a space for allowing the cooling air to flow between the plurality of dimming parts and the light modulation devices becomes necessary. As a result, diffusion of the light emitted from the effective dimming area becomes large, and it results that the periphery of the desired pixel intended to be illuminated is also illuminated out of the image forming area, and thus the image to be displayed becomes blurred. In contrast, in the configuration of imaging the light emitted from the effective dimming area in the image forming area, the shape of the dimming part emitting the light out of the plurality of dimming parts directly appears in the image forming area, and therefore, the shape overlaps the image to be formed in the image forming area, and thus, the image to be displayed becomes to lack sharpness.

According to this configuration, the illumination device is provided with the imaging optical system described above, and therefore makes the light emitted from the effective dimming area enter the image forming area in a defocused state. Since it is possible to appropriately diffuse the light emitted from the effective dimming area to illuminate the image forming area due to this configuration, it becomes possible to display the image in which the blur and the lack of sharpness of the image described above are suppressed. In particular, in the configuration in which the image forming area is formed at high resolution, a marked effect is obtained.

APPLICATION EXAMPLE 6

In the display device according to the application example described above, it is preferable to further include a projection optical device adapted to project the light modulated by the light modulation device, and it is preferable that the plurality of dimming parts is provided with a light source adapted to emit light, and a dimming device adapted to modulate the light emitted from the light source.

According to this configuration, the display device modulates the light emitted from the light source with the dimming device to thereby control the light intensity to illuminate the image forming area, and then projects the light modulated by the light modulation device using the projection optical device. Thus, an improvement in the contrast ratio is achieved, and the degradation of the luminance in the end parts in the image to be displayed is suppressed, and thus it becomes possible to realize the display device for displaying a high-quality image on the projection surface such as a screen.

APPLICATION EXAMPLE 7

In the display device according to the application example described above, it is preferable that the dimming parts are each a solid-state light source adapted to emit the light so that the light intensity can be controlled, and the illumination device is provided with a solid-state light source array having the solid-state light sources arranged.

According to this configuration, the display device illuminates the image forming area with the light emitted by the solid-state light source array and controlled in the light intensity. Thus, an improvement in the contrast ratio is achieved, and the degradation of the luminance in the end parts in the image to be displayed is suppressed, and thus it becomes possible to realize the display device for displaying a high-quality image in the light modulation device.

BRIEF DESCRIPTION OF DRAWINGS

FIGS. 10A through 10C are diagrams for comparing with the projector according to the second embodiment.

FIGS. 11A through 11C are schematic diagrams for explaining a projection image projected from the projector according to the second embodiment.

FIGS. 12A through 12C are schematic diagrams for explaining the fact that a halo occurs in the case in which a configuration is different from that of the projector according to the second embodiment, and are diagrams of the case in which a defocus amount is too large.

FIGS. 13A through 13C are schematic diagrams for explaining the fact that a halo occurs in the case in which a configuration is different from that of the projector according to the second embodiment, and are diagrams of the case in which there is adopted a configuration in which the light emitted from the effective dimming area is imaged in the image forming area.

FIGS. 14A through 14C are schematic diagrams for explaining a projection image projected from the projector according to the second embodiment.

DESCRIPTION OF EMBODIMENTS (First Embodiment)

Hereinafter, a projector as a display device according to a first embodiment will be described with reference to the drawings.

The projector according to the present embodiment modulates the light, which has been emitted from a light source, in accordance with image information, and then projects the light thus modulated on a projection surface such as a screen.

[Configuration of Optical System of Projector]

Figure 1:
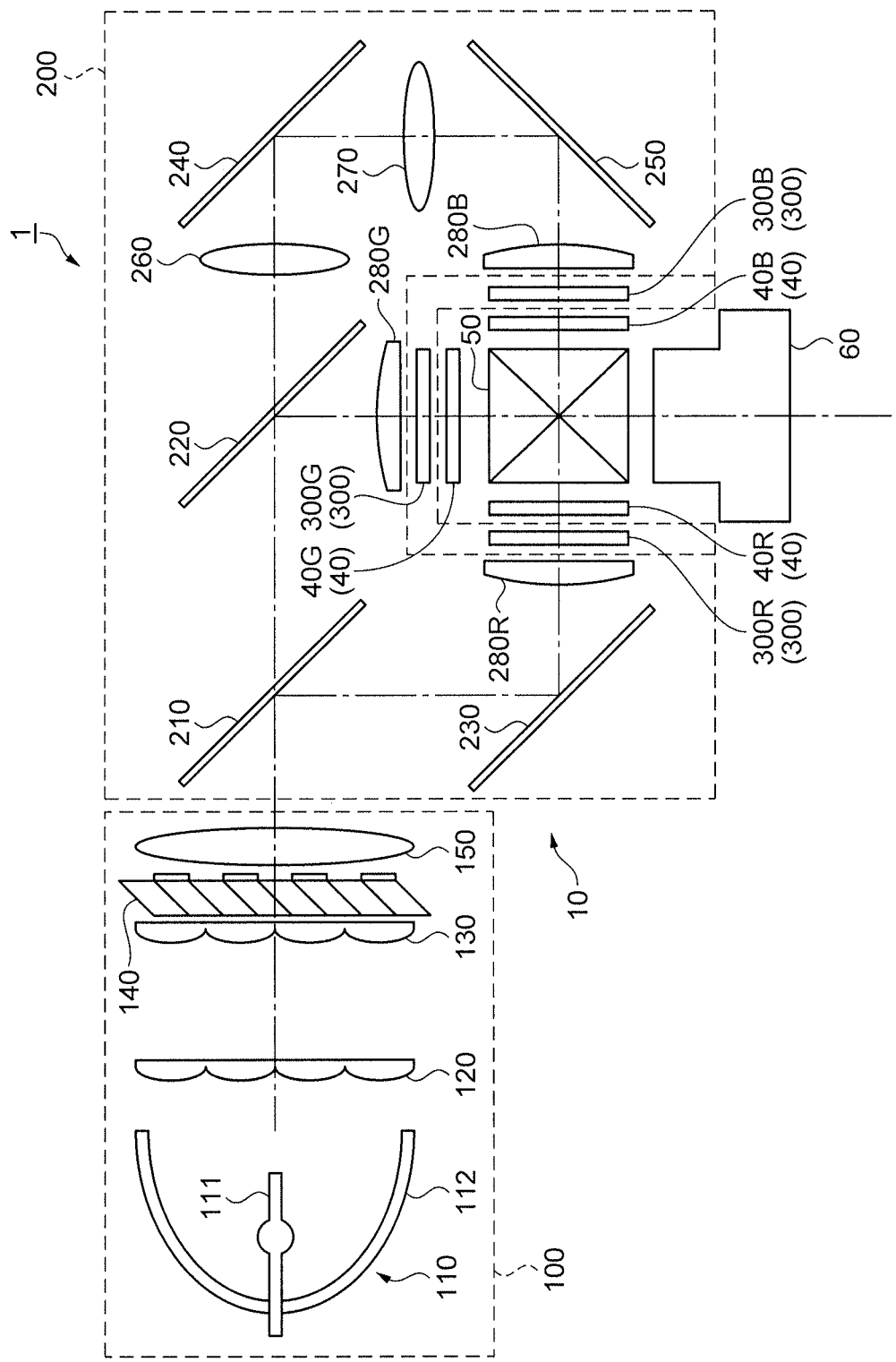
FIG. 1 is a schematic diagram showing a schematic configuration of an optical system provided to a projector according to a first embodiment.

FIG. 1 is a schematic diagram showing a schematic configuration of an optical system provided to the projector 1 according to the present embodiment.

As shown in FIG. 1, the projector 1 is provided with an illumination device 10, light modulation devices 40, a cross dichroic prism 50 as a color combining optical device, and a projection lens 60 as a projection optical device, and these optical components are held by an optical component housing not shown. It should be noted that although not shown in the drawings, the projector 1 is provided with a control section for controlling the operation of the projector 1, a power supply device for supplying the power to each of the devices, a cooling device for cooling the optical system and the power supply device, and an exterior housing for housing these devices inside in addition to the optical system described above.

The illumination device 10 is provided with an integrator illumination optical system 100, a color separation optical system 200 for separating the light emitted from the integrator illumination optical system 100 into red light (hereinafter referred to as "R light"), green light (hereinafter referred to as "G light"), and blue light (hereinafter referred to as "B light"), and dimming devices 300. The dimming devices 300 are respectively provided for the R light, the G light, and the B light. The dimming devices 300 respectively provided for the R light, the G light, and the B light are defined as a dimming device 300R, a dimming device 300G, and a dimming device 300B.

The integrator illumination optical system 100 is provided with a light source device 110, a first lens array 120, a second lens array 130, a polarization conversion element 140 as polarization conversion means, and an overlapping lens 150.

The light source device 110 is provided with a discharge type light source 111 formed of a super-high pressure mercury lamp, a metal halide lamp, or the like, a reflector 112, and so on, and emits light toward the first lens array 120. The first lens array 120 is provided with a plurality of small lenses, and divides the light from the light source device 110 into two or more partial light beams. The second lens array 130 and the overlapping lens 150 collect the plurality of partial light beams from the first lens array 120, and then overlap them on the image forming areas described later of the light modulation devices 40. The polarization conversion element 140 disposed between the second lens array 130 and the overlapping lens 150 is provided with a polarization separation film and a wave plate, and uniforms the light having random polarization directions emitted from the light source device 110 into polarized light having a predetermined direction.

The color separation optical system 200 is provided with dichroic mirrors 210, 220, reflecting mirrors 230, 240, and 250, relay lenses 260, 270, and field lenses 280R, 280G, and 280B, and separates the white light emitted from the integrator illumination optical system 100 into the three colored light beams of the R light, the G light, and the B light, and guides the colored light beams to the dimming devices 300 for the respective colored light beams. It should be noted that the reflecting mirrors 240, 250, and the relay lenses 260, 270 are referred to as a relay optical system.

The dichroic mirror 210 reflects the R light and transmits the G light and the B light out of the white light emitted from the integrator illumination optical system 100. The dichroic mirror 220 reflects the G light, and transmits the B light out of the light transmitted through the dichroic mirror 210.

The R light separated by the dichroic mirror 210 is reflected by the reflecting mirror 230, and then enters the dimming device 300R for the R light via the field lens 280R.

The G light reflected by the dichroic mirror 220 enters the dimming device 300G for the G light via the field lens 280G.

Then, the B light transmitted through the dichroic mirror 220 enters the dimming device 300B for the B light through the relay lenses 260, 270, the reflecting mirrors 240, 250, and further the field lens 280B.

It should be noted that the optical system of the present embodiment is assumed to have a configuration in which the B light is guided by the relay optical system to the dimming device 300B, but is not limited to this configuration, and can also have a configuration in which, for example, the R light is guided by the relay optical system to the dimming device 300R.

The dimming devices 300 are each provided with a liquid crystal panel, and each modulate the colored light beam separated by the color separation optical system 200 in accordance with the image information to thereby control the light intensity of the light for illuminating the light modulation device 40.

The light modulation devices 40 are respectively provided for the R light, the G light, and the B light, and modulate the colored light beams emitted from the dimming devices 300 in accordance with the image information to form display images of the respective colored light beams. The light modulation devices 40 respectively provided for the R light, the G light, and the B light are defined as a light modulation device 40R, a light modulation device 40G, and a light modulation device 40B.

The dimming devices 300 and the light modulation devices 40 will be described later in detail.

As shown in FIG. 1, the cross dichroic prism 50 has a substantially rectangular planar shape having four rectangular prisms bonded to each other, and on the interfaces on which the rectangular prisms are bonded to each other, there are formed two dielectric multilayer films.

In the cross dichroic prism 50, the dielectric multilayer films reflect the R light and the B light modulated by the light modulation devices 40R, 40B while transmitting the G light modulated by the light modulation device 40G to thereby combine the colored light beams with each other.

The projection lens 60 is configured including a plurality of lenses (not shown), and projects the light combined by the cross dichroic prism 50 on the projection surface such as a screen in an enlarged manner.

[Configuration of Dimming Devices and Light Modulation Devices]

Here, the dimming devices 300 and the light modulation devices 40 will be described in detail.

Figure 2:
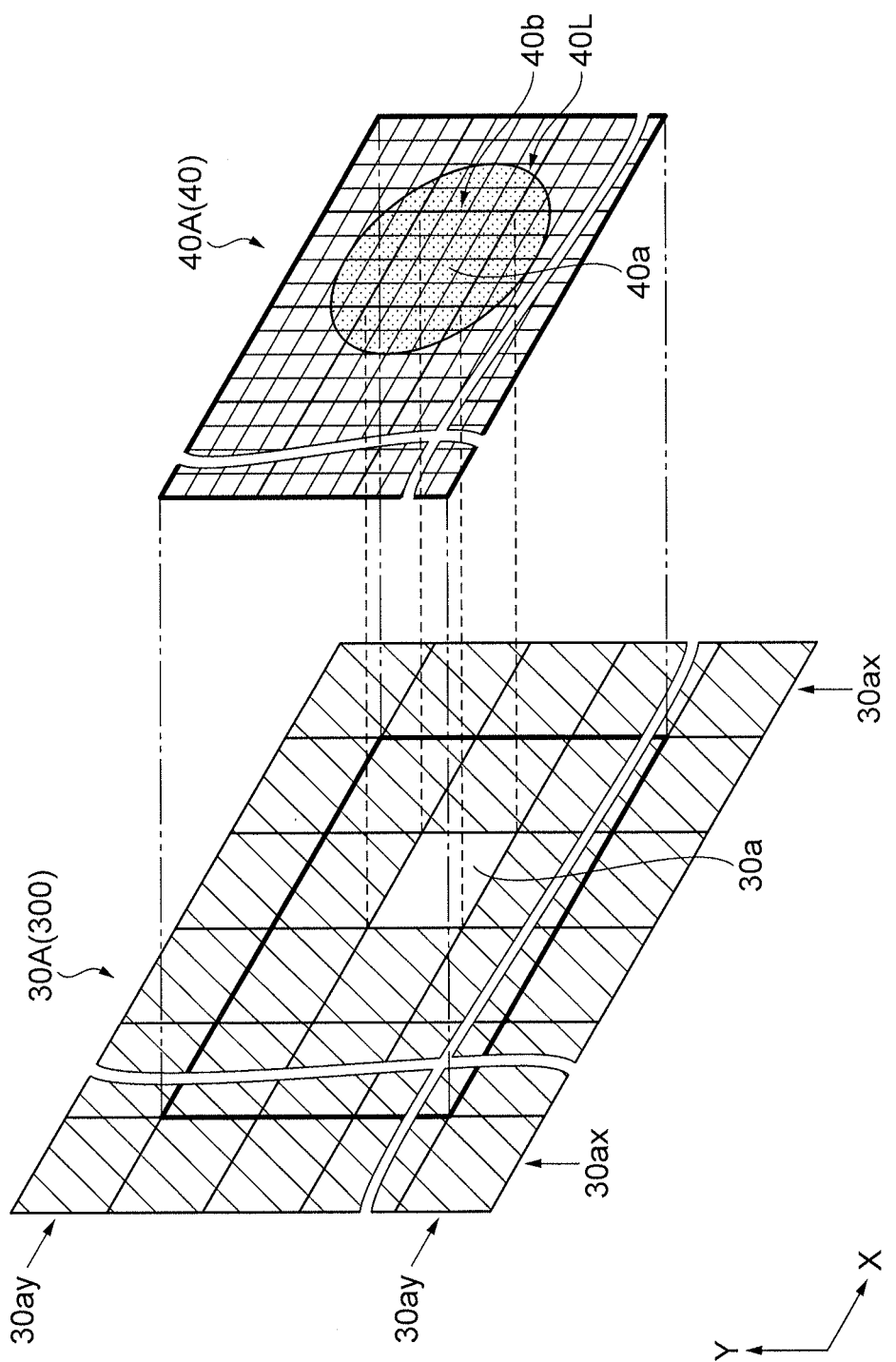
FIG. 2 is a diagram schematically showing an effective dimming area in a dimming device according to the first embodiment, and an image forming area in a light modulation device.

FIG. 2 is a schematic diagram showing a part of the dimming device 300 and the light modulation device 40, and is a diagram showing an effective dimming area 30A and an image forming area 40A described later.

Firstly, the dimming devices 300 will be described.

The dimming devices 300 are each provided with an incident side polarization plate and an exit side polarization plate respectively disposed on the light entrance side and the light exit side of the liquid crystal panel in addition to the liquid crystal panel.

The liquid crystal panel has a configuration in which liquid crystal is airtightly encapsulated between a pair of substrates made of glass or the like. One of the substrates is provided with a plurality of pixel electrodes arranged in a matrix, switching elements connected respectively to the pixel electrodes, and so on, and the other of the substrates is provided with a common electrode, a black matrix as a light blocking member, and so on.

The black matrix is formed to have a grid-like pattern so as to compartment the pixels in a planar view, and the rectangular areas surrounded by the black matrix form transmitting parts for transmitting the light.

In the liquid crystal panel, a voltage is applied between the pixel electrode and the common electrode in accordance with a drive signal from the control section. Then, the level of the voltage applied to each of the pixel electrodes is changed, and thus, the orientational state of the liquid crystal intervening between the pixel electrode and the common electrode is controlled, and thus, the liquid crystal panel modulates the incident light.

The incident side polarization plate transmits the polarized light uniformed by the polarization conversion element 140 out of the colored light beams separated by the color separation optical system 200, and absorbs polarized light different from that polarized light to emit the result to the liquid crystal panel. The liquid crystal panel modulates the light emitted from the incident side polarization plate in accordance with the image information. The exit side polarization plate transmits the polarized light with a certain direction out of the light emitted from the liquid crystal panel, and absorbs polarized light different from that polarized light to emit the result to the light modulation device 40.

Further, as shown in FIG. 2, it results that in the dimming device 300, two or more dimming parts 30a each corresponding to one pixel electrode of the liquid crystal panel, and the light intensity of which can be controlled, are arranged in a matrix. The two or more dimming parts 30a are formed to have the same shape as each other, and the dimming device 300 modulates the incident colored light beam in the effective dimming area 30A where the two or more dimming parts 30a are arranged to thereby control the intensity of the light to be transmitted.

Further, the dimming parts 30a are formed so that the number of the dimming parts 30a is smaller than the number of pixels of the light modulation device 40. The number of the dimming parts 30a arranged in a first direction X is about 250, and the number of the dimming parts 30a arranged in a second direction Y perpendicular to the first direction X is about 125, for example. Here, the first direction X denotes the direction corresponding to a horizontal direction of the image viewed from the observer observing the image projected from the projector 1, and the second direction Y denotes the direction corresponding to a vertical direction of the image viewed from the observer. It should be noted that the dimming parts 30a can also be configured so that the number of the dimming parts 30a is other than 250×125.

Then, the light emitted from the dimming parts 30a illuminates the image forming area 40A.

Then, the light modulation devices 40 will be described. Similarly to the dimming devices 300, the light modulation devices 40 are each provided with the liquid crystal panel, and an incident side polarization plate and an exit side polarization plate respectively disposed on the light entrance side and the exit side of the liquid crystal panel. Here, the polarization plate disposed between the dimming device 300 and the light modulation device 40 can be used for the both purposes.

The light modulation devices 40 are each formed so as to have the resolution higher than the resolution of the dimming devices 300. The number of the pixels 40a of the light modulation device 40 arranged in the first direction X is, for example, about 4,000, and the number of the pixels 40a arranged in the second direction Y is, for example, about 2,000, and the display image is formed in the image forming area 40A where the plurality of pixels 40a is arranged. It should be noted that the pixels of the light modulation device 40 can also be configured so that the number of the pixels is other than 4,000×2,000. Further, the liquid crystal panel, the incident side polarization plate and the exit side polarization plate of the light modulation device 40 are arranged at intervals, and the image forming area 40A in this case is an area at the position of the liquid crystal panel. Further, a dummy pixel disposed in the outer periphery of the liquid crystal panel, and a pixel for position correction for correcting the displacement between the light modulation devices of the colored light beams, or the displacement with the dimming device 300 are not included in the image forming area 40A since it cannot be said that the image is formed in the dummy pixel and the pixel for the position correction.

Further, the grayscale of each of the colors in the light modulation device 40 is configured so as to be able to realize, for example, 256 gray levels. It should be noted that the number of gray levels of each of the colors in the dimming device 300 can be made equivalent to the number of gray levels of the light modulation device 40, or can also be set to a different number of gray levels.

Then, the grayscale of the dimming parts 30a of the dimming device 300 is generated based on the image data corresponding to the plurality of images 40a included in an illumination area 40L (see FIG. 2) out of the input image signal to the projector 1. For example, it is possible to adopt a signal based on the maximum value of the image data corresponding to the pixel 40a included in the illumination area 40L in a certain frame or a sub-frame. Further, it is also possible to adopt one obtained by averaging the gray levels corresponding to a plurality of pixels of the certain frame or the sub-frame throughout a plurality of frames.

Here, the intensity on the image forming area 40A of the light emitted from the dimming device 300 will be described.

As shown in FIG. 2, the light exit side of the plurality of dimming parts 30a and the light incident side of the image forming area 40A are arranged so as to be opposed to each other, and as described above, the number of the dimming parts 30a arranged in the first direction X is about 250, and the number of the dimming parts 30a arranged in the second direction Y is about 125, for example, and the number of the pixels 40a of the light modulation device 40 arranged in the first direction X is about 4,000, and the number of the pixels 40a arranged in the second direction Y is about 2,000, for example.

As shown in FIG. 2, the effective dimming area 30A is formed so as to be larger than the image forming area 40A in the first direction X and the second direction Y, and the light emitted from one dimming part 30a illuminates a plurality of pixels 40a. For example, in one dimming part 30a, the light emitted from the dimming part 30a mainly illuminates the pixels 40a arranged as much as about 16 pieces in each of the first direction X and the second direction Y. The plurality of pixels 40a corresponding to the one dimming part 30a is defined as a pixel group 40b. It should be noted that in FIG. 2, in order to make it easy to recognize the pixels 40a, the number of the pixels 40a in one pixel group 40b is shown as 4×4.

Further, the dimming parts 30a located outermost side of the effective dimming area 30A are arranged so as to correspond to the outside of the image forming area 40A. Specifically, the dimming parts 30ax located on both end parts of the effective dimming area 30A in the first direction X, and arranged along the second direction Y to form one line in each of the end parts are arranged so that the outside areas of the image forming area 40A in the first direction X are mainly irradiated with the light. Further, the dimming parts 30ay located on both end parts of the effective dimming area 30A in the second direction Y, and arranged along the first direction X to form one line in each of the end parts are arranged so that the outside areas of the image forming area 40A in the second direction Y are mainly irradiated with the light.

As shown in FIG. 2, the light emitted from one dimming part 30a illuminates one pixel group 40b corresponding to this dimming part 30a and the peripheral area of this pixel group 40b. The pixel group 40b and the peripheral area of the pixel group 40b illuminated by the light emitted from the dimming part 30a are defined as an illumination area 40L.

Therefore, it results that the illumination areas 40L, which are illuminated by the light emitted from the dimming parts 30a adjacent to each other, partially overlap each other.

Figures 3A, 3B:
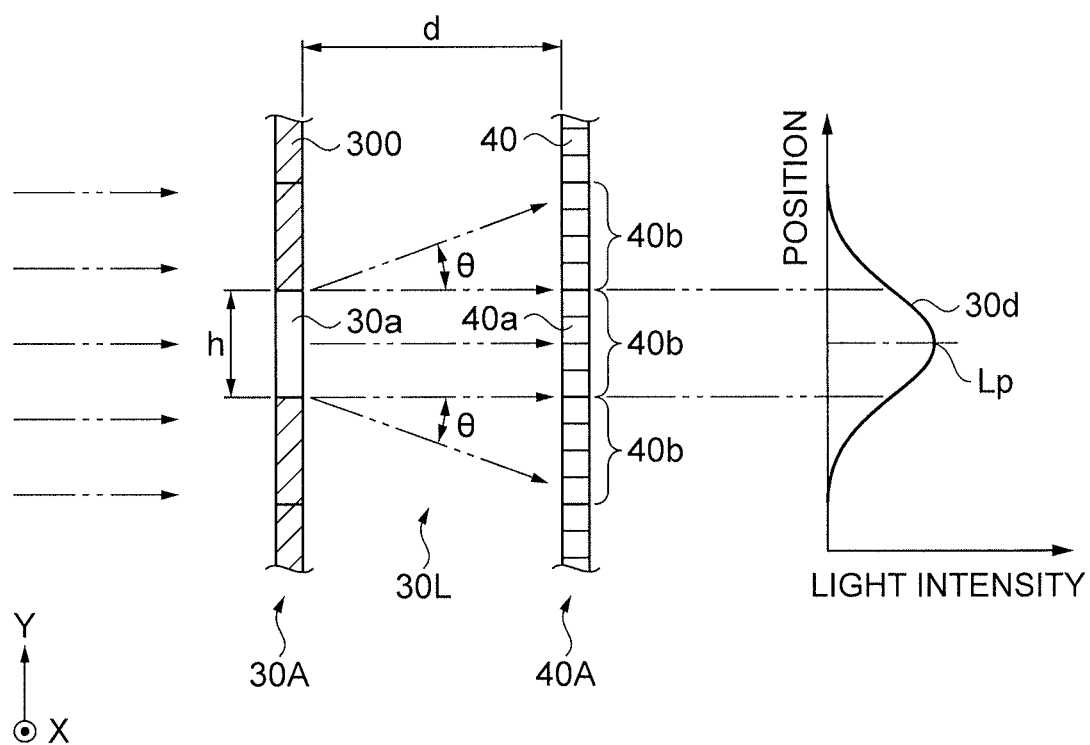
FIGS. 3A and 3B are diagrams for explaining the intensity on an image forming area of the light emitted from a dimming part of the first embodiment.

FIGS. 3A and 3B are schematic diagrams for explaining the intensity on the image forming area 40A of the light emitted from the dimming part 30a. Specifically, FIGS. 3A and 3B are diagrams for explaining the intensity of the light emitted from one dimming part 30a, wherein FIG. 3A is a diagram for explaining the light path of the light 30L emitted from the dimming part 30a, and FIG. 3B is a diagram showing the intensity distribution of the light 30L.

As shown in FIG. 3A, the dimming device 300 and the light modulation device 40 are arranged with a distance d, and the light emitted from one dimming part 30a proceeds toward the image forming area 40A in a diffused manner. Specifically, the dimming part 30a has a length h in the second direction Y, and the light emitted from an area of the length h includes a principal ray mainly proceeding toward the pixel group 40b and a sub-ray in a range having an angle θ with the principal ray. It results that the sub-ray proceeds toward the adjacent pixel group 40b. In other words, in the case in which the light is also emitted from the adjacent dimming part 30a, it results that the sub-ray overlaps the principal ray emitted from the adjacent dimming part 30a.

Further, as shown in FIG. 3B, the intensity distribution 30d of the light 30L emitted from the dimming part 30a draws a curve having a peak Lp at the center, and going downward as the distance from the center increases.

Figure 4B:
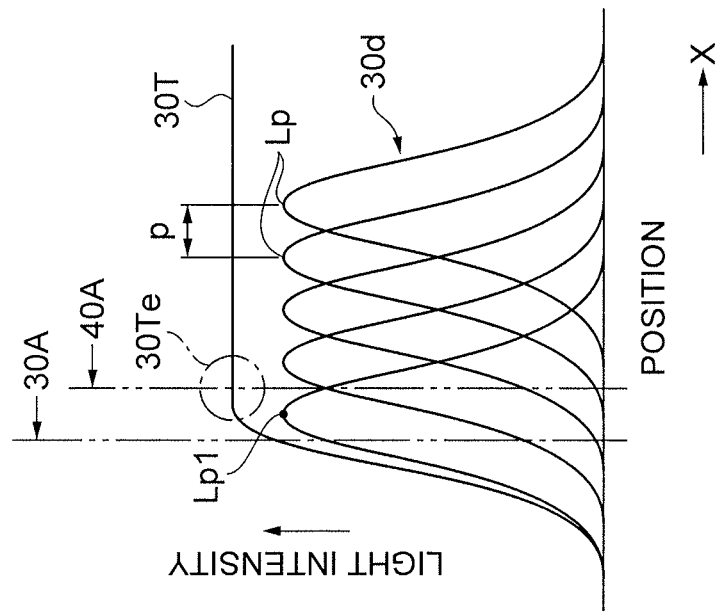
FIGS. 4A and 4B are schematic diagrams for explaining the intensity on the image forming area of the light emitted from the dimming part in the vicinity of an end part of the effective dimming area in the first embodiment.
Figure 4A:
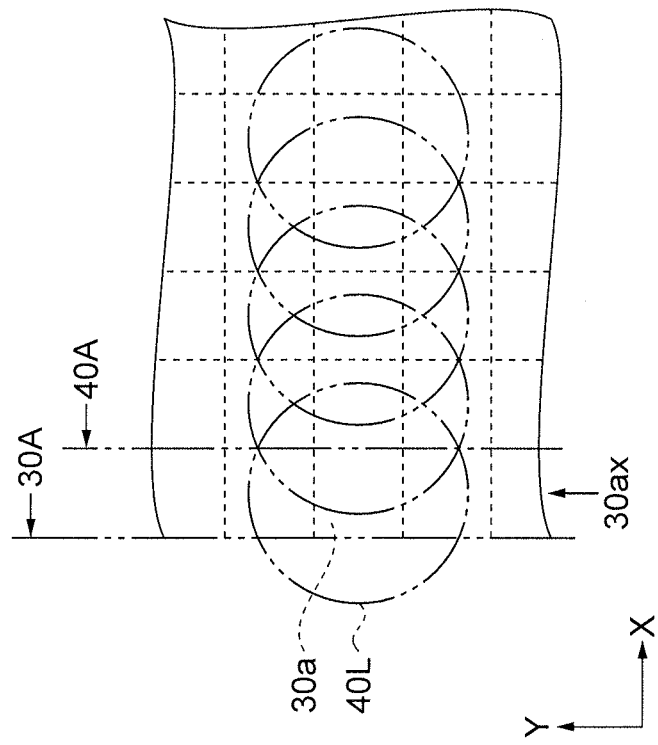

FIGS. 4A and 4B are schematic diagrams for explaining the intensity on the image forming area 40A of the light emitted from the dimming part 30a located in the vicinity of the end part in the effective dimming area 30A. Specifically, FIG. 4A is a plan view showing a positional relationship between the effective dimming area 30A and the image forming area 40A in the vicinity of one (left side) of the end parts of the effective dimming area 30A in the first direction X, and is a diagram showing the illumination area 40L by the light emitted from the dimming parts 30a arranged in a line along the first direction X. FIG. 4B is a schematic diagram showing the intensity distribution 30T on the image forming area 40A of the light emitted from the dimming part 30a in FIG. 4A. It should be noted that FIG. 4A is a diagram with the pixels 40a eliminated. Further, the illumination area 40L is emitted from the dimming part 30a having a rectangular shape, and therefore has a shape formed by smoothly connecting the corner parts of a rectangular shape larger in size than the dimming part 30a, but is shown with a circular shape in FIG. 4A.

As shown in FIG. 4A, in the first direction X, the illumination areas 40L, which are illuminated by the light emitted from the dimming parts 30a adjacent to each other, partially overlap each other. Further, as shown in FIG. 4B, in the intensity distributions 30d of the light emitted from the respective dimming parts 30a, the peaks Lp are arranged side by side at a pitch p, namely with roughly the same distances.

Further, as shown in FIG. 4B, the peak Lp1 of the intensity of the light emitted from the dimming part 30a located on the outermost side in the effective dimming area 30A is located outside the image forming area 40A. Then, the light in the overlapping part in the illumination area 40L is combined, and as a result, the image forming area 40A is illuminated by the light having the intensity distribution 30T with roughly uniform intensity including the end part (see 30Te in FIG. 4B) of the image forming area 40A as shown in FIG. 4B.

Although not shown in the drawings, similarly to the one side (the left side) of the image forming area 40A in the first direction X, the vicinity of the other (the right side) of the end parts of the image forming area 40A in the first direction X, and the vicinities of the end parts on both sides of the image forming area 40A in the second direction Y are also illuminated.

Figure 5B:
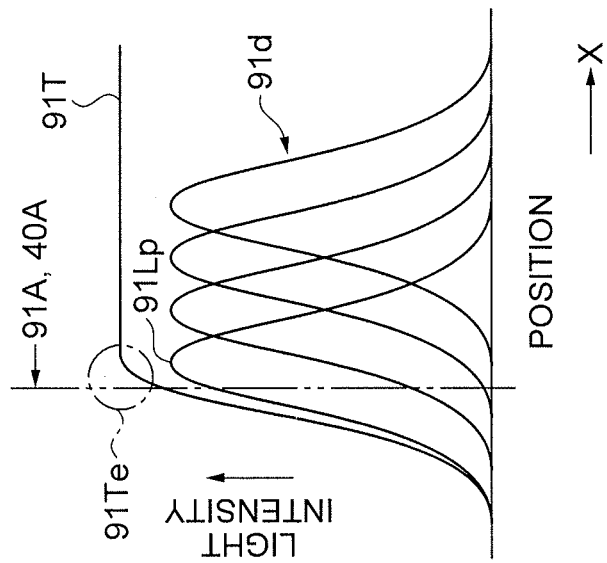
FIGS. 5A and 5B are diagrams for comparing with the projector according to the first embodiment.
Figure 5A:
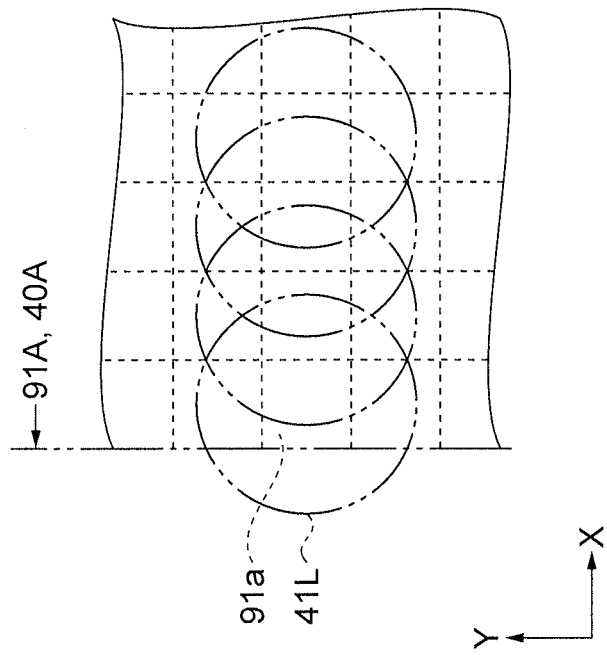

FIGS. 5A and 5B are diagrams for comparing with the projector 1 according to the present embodiment, and are diagrams for explaining the intensity of the light on the image forming area 40A in the case in which the dimming device is provided with a different effective dimming area 91A from the effective dimming area 30A of the present embodiment, and the effective dimming area 91A is not provided with the dimming parts corresponding to the outside of the image forming area 40A (e.g., the case in which the effective dimming area 91A is formed so as to be roughly the same in size as the image forming area 40A).

Specifically, FIG. 5A is a plan view showing a positional relationship between the effective dimming area 91A and the image forming area 40A in the vicinity of one (left side) of the end parts of the effective dimming area 91A in the first direction X, and is a diagram showing the illumination area 41L by the light emitted from the dimming parts 91a arranged in a line along the first direction X. FIG. 5B is a schematic diagram showing the intensity distribution 91T on the image forming area 40A of the light emitted from the dimming part 91a in FIG. 5A.

As shown in FIGS. 5A and 5B, in the case in which the dimming parts corresponding to the outside of the image forming area 40A are not provided to the effective dimming area 91A, the intensity distributions 91d of the light emitted from the respective dimming parts are arranged at roughly the same intervals as shown in FIG. 5B, but the peak 91Lp of the intensity of the light emitted from the dimming part 91a located on the outermost side in the effective dimming area 91A is located inside the image forming area 40A. As a result, as shown in FIG. 5B, the end part of the image forming area 40A is illuminated by the weak light (see 91Te in FIG. 5B).

Although not shown in the drawings, in the configuration shown in the comparative example, it results that the end parts on the both sides in each of the first direction X and the second direction Y in the image forming area 40A are illuminated by the light low in intensity.

In contrast, the projector 1 according to the present embodiment is formed so that the position of the peak Lp of the intensity distribution of the light emitted from the dimming part 30a located on the outermost side out of the effective dimming area 30A is located outside the image forming area 40A. Further, in the image forming area 40A, the vicinity of the end part is illuminated at roughly the same luminance as in the central part.

It should be noted that the projector 1 according to the present embodiment is formed so that the position of the peak Lp of the intensity distribution of the light emitted from the dimming part 30a located on the outermost side of the effective dimming area 30A is located outside the image forming area 40A, but can also be formed so that the position of the peak Lp of the intensity distribution of the light emitted from the dimming part 30a located on the outermost side is located on the outer edge of the image forming area 40a.

Figure 6:
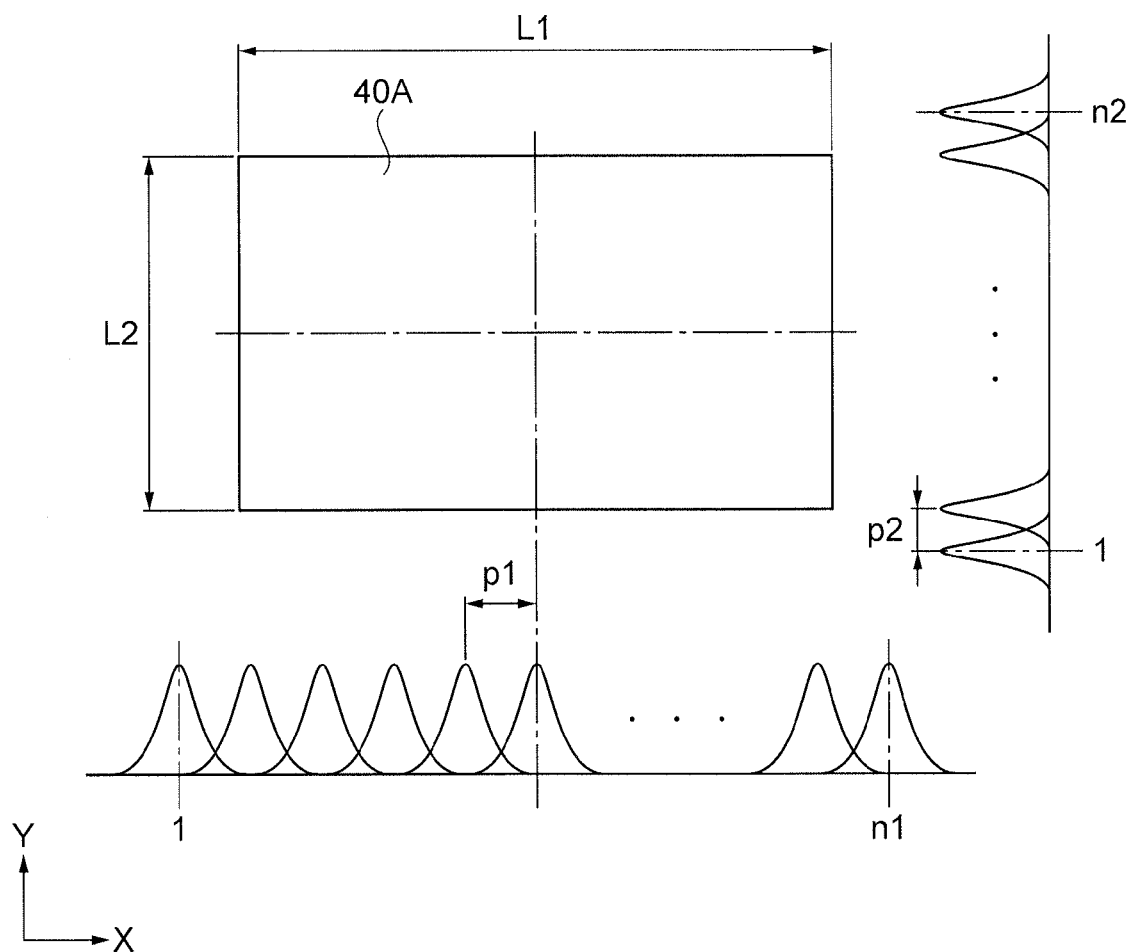
FIG. 6 is a schematic diagram for explaining the relationship between a peak position of an intensity distribution of the light emitted from the dimming part located on the outermost side and the image forming area in the first embodiment.

FIG. 6 is a schematic diagram for explaining the relationship between a peak position of the intensity distribution of the light emitted from the dimming part 30a located on the outermost side and the image forming area 40A.

As shown in FIG. 6, in the case of denoting the length in the first direction X of the image forming area 40A by L1, the intervals of the peaks of the intensity distributions in the first direction X of the light emitted from the plurality of dimming parts 30a by p1, and the number of the dimming parts 30a in the first direction X of the effective dimming area 30A by n1, it is sufficient to fulfill $p1 \times (n1-1)L1$.

Here, the intervals p1 of the peaks are wider than the intervals of the pixels in the first direction X of the light modulation device 400, and can also be set to an integral multiple of the intervals of the pixels.

Further, in the case of denoting the length in the second direction Y of the image forming area 40A by L2, the intervals of the peaks of the intensity distributions in the second direction Y of the light emitted from the plurality of dimming parts 30a by p2, and the number of the dimming parts 30a in the second direction Y of the effective dimming area 30A by n2, it is sufficient to fulfill $p2 \times (n2-1)L2$.

Similarly to the intervals p1, the intervals p2 of the peaks are wider than the intervals of the pixels in the second direction Y of the light modulation device 400, and can also be set to an integral multiple of the intervals of the pixels.

As described hereinabove, according to the present embodiment, the following advantages can be obtained.

(1) Since the image forming area 40A is illuminated by the light controlled in light intensity by the dimming device 300, it becomes possible for the projector 1 to improve the contrast ratio, and to display an image with the dynamic range expanded.

Further, since the position of the peak Lp of the intensity distribution of the light emitted from each of the dimming parts 30ax, 30ay located on the outermost side of the effective dimming area 30A is located on the outer edge of the image forming area 40A or outside the image forming area 40A, it becomes possible to illuminate the image forming area 40A at uniform luminance including the end parts of the image forming area 40A. Therefore, it is possible to inhibit the degradation of the luminance of the end parts in the image displayed.

Therefore, it becomes possible to provide the projector 1 as the display device capable of displaying a high-quality image.

(2) There is adopted the configuration in which the position of the peak Lp of the intensity distribution of the light emitted from each of the dimming parts 30ax, 30ay located on the outermost side of the effective dimming area 30A in the first direction X or the second direction Y is located on the outer edge of the image forming area 40A or outside the image forming area 40A. According to this configuration, it becomes possible to display an image in which there is suppressed the degradation of the luminance of the end parts of the image in the horizontal direction and the vertical direction viewed from the observer observing the projection image.

(3) It is possible to achieve the configuration in which the position of the peak Lp of the intensity distribution of the light emitted from each of the dimming parts 30ax, 30ay located on the outermost side of the effective dimming area 30A is located on the outer edge of the image forming area 40A or outside the image forming area 40A using a simple configuration of forming the effective dimming area 30A to be larger than the image forming area 40A and disposing the dimming device 300 and the light modulation device 40 so as to be opposed to each other. Thus, it becomes possible to realize the projector 1 provided with the illumination device 10 capable of illuminating the image forming area 40A at uniform luminance including the end parts of the image forming area 40A while inhibiting the complicated structure and growth in size of the projector 1.

(Second Embodiment)

Hereinafter, a projector according to a second embodiment will be described with reference to the accompanying drawings. In the following description, similar configurations and similar members to those of the projector 1 according to the first embodiment are denoted by the same reference symbols, and the detailed description thereof will be omitted or simplified.

The projector 2 according to the present embodiment is provided with an optical system different from the optical system in the projector 1 according to the first embodiment.

Figure 7:
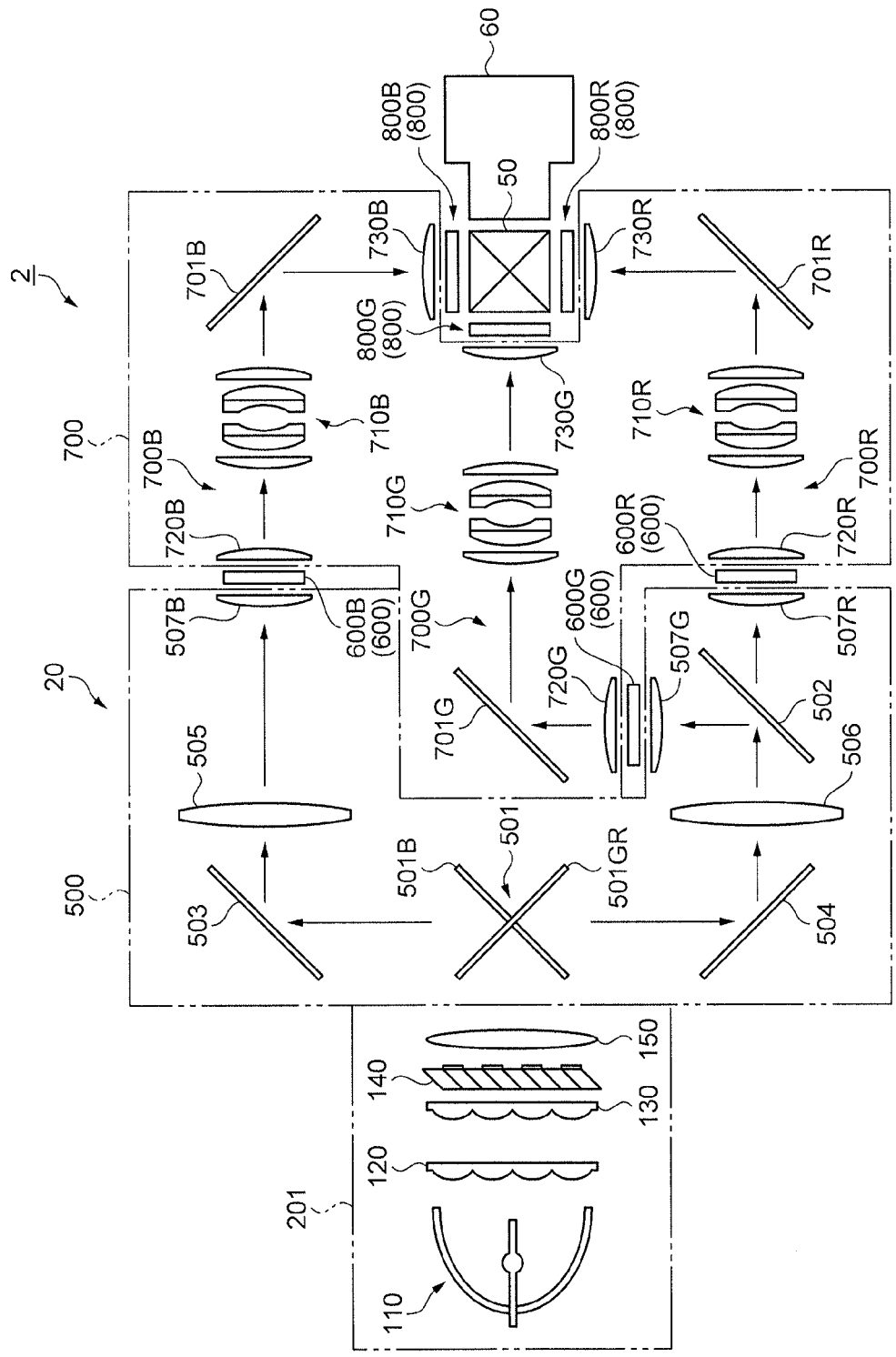
FIG. 7 is a schematic diagram showing a schematic configuration of an optical system provided to a projector according to a second embodiment.

FIG. 7 is a schematic diagram showing a schematic configuration of the optical system provided to the projector 2 according to the present embodiment.

As shown in FIG. 7, the optical system of the projector 2 is provided with an illumination device 20, light modulation devices 800, the cross dichroic prism 50 as the color combining optical device, and the projection lens 60 as the projection optical device.

The illumination device 20 is provided with an integrator illumination optical system 201, a color separation optical system 500, dimming devices 600, and an imaging optical system 700. The dimming devices 600 are provided respectively for the R light, the G light, and the B light, and the dimming devices 600 for the R light, the G light, and the B light are defined as a dimming device 600R, a dimming device 600G, and a dimming device 600B, respectively.

The integrator illumination optical system 201 is configured similarly to the integrator illumination optical system 100 in the first embodiment.

The color separation optical system 500 is provided with a cross dichroic mirror 501, a dichroic mirror 502, reflecting mirrors 503, 504, relay lenses 505, 506, and field lenses 507R, 507G, and 507B. The color separation optical system 500 separates the light emitted from the integrator illumination optical system 201 in to three colors of colored light beams, namely the R light, the G light, and the B light, and then guides the colored light beams to the dimming devices 600.

The cross dichroic mirror 501 is provided with dichroic mirrors 501B, 501GR, and is formed of the two optical components arranged in a cross shape. The cross dichroic mirror 501 reflects the B light out of the light emitted from the integrator illumination optical system 201 with the dichroic mirror 501B, and reflects the G light and the R light with the dichroic mirror 501GR to thereby separate the incident light beam.

The B light reflected by the dichroic mirror 501B is reflected by the reflecting mirror 503 and then enters the dimming device 600B via the relay lens 505 and the field lens 507B. Meanwhile, the G light and the R light reflected by the dichroic mirror 501GR are reflected by the reflecting mirror 504, and then enter the dichroic mirror 502 via the relay lens 506.

The dichroic mirror 502 reflects the G light out of the G light and the R light having entered, and transmits the R light to thereby separate the light beam having entered.

Then, the G light reflected by the dichroic mirror 502 enters the dimming device 600G via the field lens 507G, and the R light transmitted through the dichroic mirror 502 enters the dimming device 600R via the field lens 507R.

The dimming devices 600 are each provided with a liquid crystal panel, and each modulate the colored light beam separated by the color separation optical system 500 to thereby control the light intensity of the light for illuminating the light modulation device 800. Although not shown in the drawings, similarly to the dimming devices 300 of the first embodiment, the dimming devices 600 each have an effective dimming area having a plurality of dimming parts arranged.

The imaging optical system 700 has three optical systems 700R, 700G, and 700B corresponding respectively to the three dimming devices 600R, 600G, and 600B, and guides the light emitted from the effective dimming areas to the image forming areas in the light modulation devices 800.

The imaging optical system 700 guides the light so that the position of the peak of the intensity distribution of the light emitted from the dimming part located on the outermost side out of the effective dimming area is located on the outer edge of the image forming area in the light modulation device 800 or outside the image forming area.

Further, the imaging optical system 700 images the colored light beams emitted from the dimming devices 600 at positions shifted from the light modulation devices 800 for the respective colored light beams in the directions along the optical axes of the light emitted from the effective dimming areas at a predetermined magnification, respectively. In other words, the imaging optical system 700 makes the light emitted from the effective dimming area enter the image forming area 800A in a defocused state. It should be noted that in the present embodiment, there is described the case in which the imaging optical system 700 is configured as a non-magnifying optical system.

The optical system 700R is made as an optical system having a double Gauss lens 710R, a pair of convex lenses 720R, 730R, and a reflecting mirror 701R, and forming a telecentric optical system on both of the light incident side and the light exit side.

The convex lens 720R is disposed on the light incident side of the double Gauss lens 710R, and the convex lens 730R is disposed on the light exit side of the double Gauss lens 710R.

The reflecting mirror 701R is disposed between the double Gauss lens 710R and the convex lens 730R, and reflects the light emitted from the double Gauss lens 710R toward the convex lens 730R.

Here, the convex lens 720R and the convex lens 730R can also be formed of a meniscus lens having positive power.

The optical system 700G has a double Gauss lens 710G, a pair of convex lenses 720G, 730G, and a reflecting mirror 701G similarly to the optical system 700R. The optical system 700G is configured similarly to the optical system 700R except the point that the position of the reflecting mirror 701G is disposed at a different position from that of the reflecting mirror 701R in the optical system 700R. Specifically, the reflecting mirror 701G is disposed between the convex lens 720G and the double Gauss lens 710G, and reflects the light emitted from the convex lens 720G toward the double Gauss lens 710G.

The optical system 700B has a double Gauss lens 710B, a pair of convex lenses 720B, 730B, and a reflecting mirror 701B similarly to the optical system 700R, and these optical components are disposed similarly to the optical components of the optical system 700R.

The light modulation devices 800 are each provided with a liquid crystal panel, and are respectively provided for the R light, the G light, and the B light. The light modulation devices 800 modulate the colored light beams guided by the imaging optical system 700 in accordance with the image information to form the display images of the colored light beams. The light modulation devices 800 respectively provided for the R light, the G light, and the B light are defined as a light modulation device 800R, a light modulation device 800G, and a light modulation device 800B.

Here, light paths of the imaging optical system 700 will be described.

Figure 8:
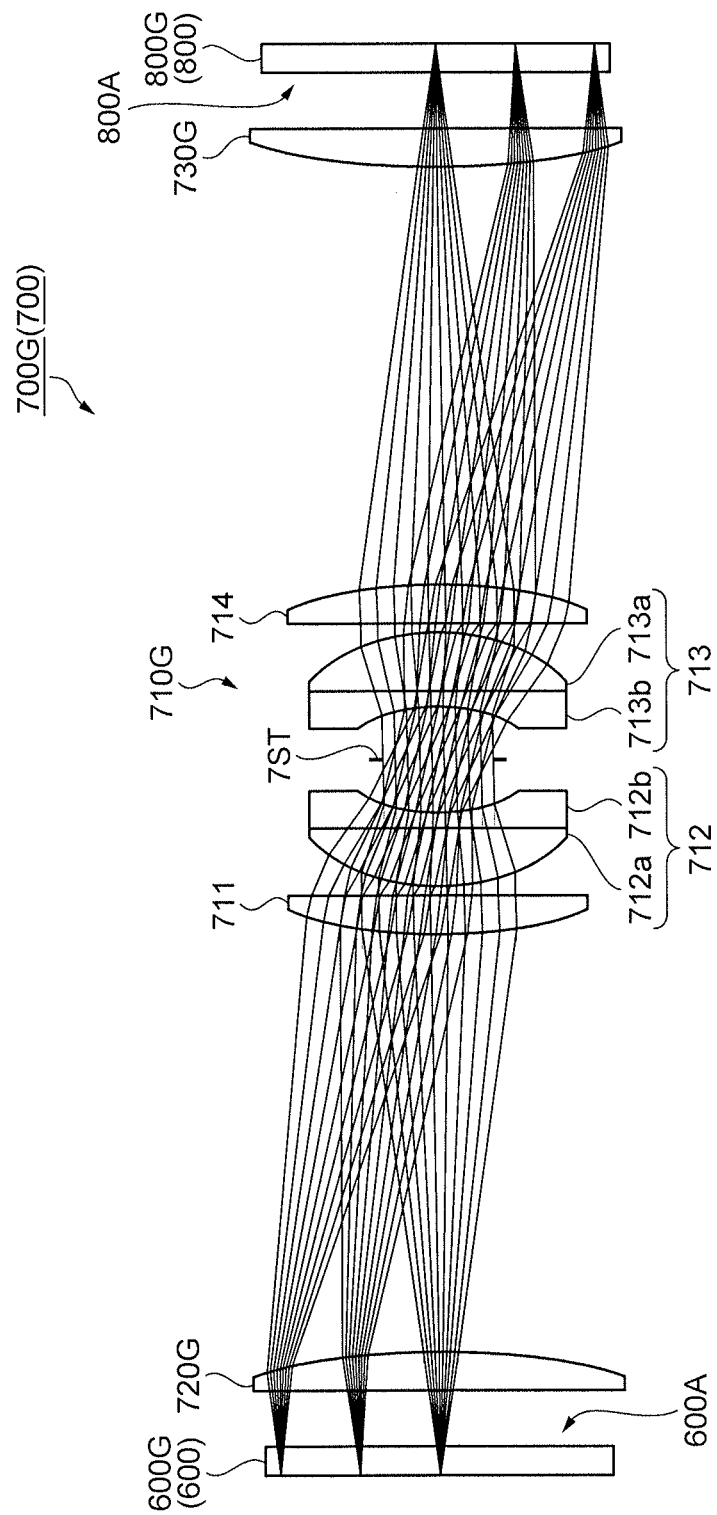
FIG. 8 is a schematic diagram for explaining a light path of an imaging optical system according to the second embodiment.

FIG. 8 is a schematic diagram for explaining the light paths of the imaging optical system 700, and the explanation will be presented focusing attention on the optical system 700G for the G light. It should be noted that FIG. 8 is a diagram with the reflecting mirror 701G omitted so as to clarify the light paths.

As shown in FIG. 8, the double Gauss lens 710G has a first lens 711, a second lens 712, and a diaphragm 7ST, a third lens 713, and a fourth lens 714 arranged in sequence from the light incident side. Further, the second lens 712 and the third lens 713 each have a configuration having two lenses combined with each other. In other words, the second lens 712 is configured by bonding a lens 712a and a lens 712b to each other, and the third lens 713 is configured by bonding a lens 713a and a lens 713b to each other.

As shown in FIG. 8, the G light emitted from the dimming device 600G (the effective dimming area 600A) enters the light modulation device 800G in a defocused state via the convex lens 720G through the convex lens 730G.

The optical system 700G has a lens configuration in which the light incident side and the light exit side are symmetrical with reference to the position of the diaphragm 7ST of the double Gauss lens 710G, and images the G light emitted from the dimming device 600G at the position shifted from the dimming device 600G in an unmagnified manner. It should be noted that besides the unmagnified manner, the imaging optical system 700 can be configured so as to achieve the magnification ratio lower than one or exceeding one. In the case of this configuration, a range disposed on the light incident side and the lens disposed on the light exit side become asymmetrical with reference to the position of the diaphragm 7ST.

Further, the imaging optical system 700 images the light emitted from the effective dimming area 600A at the position shifted from the light modulation device 800 so that moire and halo are suppressed in the image projected. It should be noted that the position where the light is imaged can be a position shifted to the light incident side or a position shifted to the light exit side with respect to the light modulation device 800G.

Here, the moire and the halo will be described.

Figure 9A:
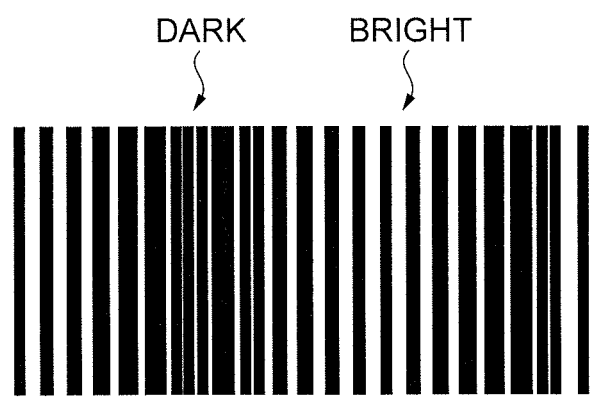
FIGS. 9A and 9B are diagrams for explaining moire.
Figure 9B:
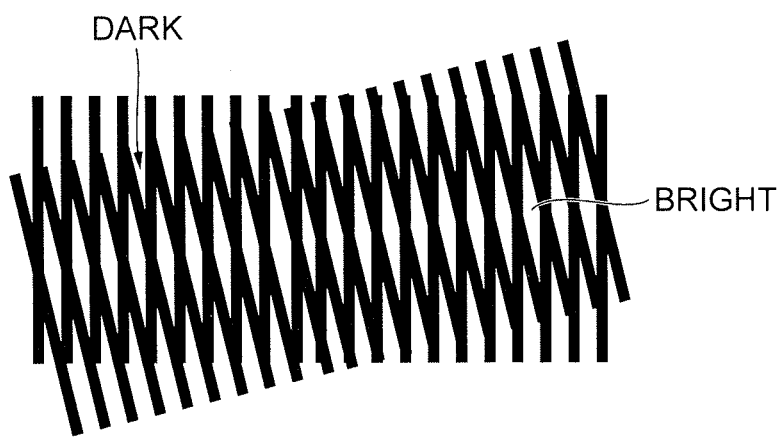

FIGS. 9A and 9B are schematic diagrams for explaining the moire.

The moire occurs when $f1 \neq n \times f2$ (n is a natural number) is fulfilled in the case in which an image having a spatial frequency f1 and an image having a spatial frequency f2 are overlapped with each other. For example, in the case in which two images each having a plurality of white strips and a plurality of black strips arranged in parallel to each other are overlapped with each other, and the condition of $f1 \neq n \times f2$ is fulfilled, the moire as a bright and dark fringe is generated in the image projected as shown in FIG. 9A.

Further, in the case in which a relative rotational difference occurs between two images, the moire occurs as shown in FIG. 9B even if $f1 = n \times f2$ is fulfilled. This is because the spatial frequency viewed from a certain direction varies due to the relative rotational difference.

FIGS. 10A through 10C are schematic diagrams for explaining the projection image in the case of adopting the configuration in which the light emitted from the dimming device 600 is imaged in the light modulation device 800 in order for the comparison with the projector 2 according to the present embodiment, and are diagrams in the case of displaying a grid-like image. Specifically, FIG. 10A is a diagram showing the state of the image forming area 800A illuminated by the light emitted from the effective dimming area 600A, FIG. 10B is a diagram showing the display image 800D displayed in the image forming area 800A, and FIG. 10C is a diagram showing the projection image 900A projected on a screen (not shown) or the like.

In the case of adopting the configuration in which the light emitted from the effective dimming area 600A is imaged in the image forming area 800A, as shown in FIG. 10A, a shadow of the black matrix provided to the liquid crystal panel in the dimming device 600 shows up on the image forming area 800A. As shown in FIG. 10B, the grid-like image is displayed in the image forming area 800A. Then, on the screen, there is displayed the projection image 900A due to the light modulated in the image forming area 800A illuminated by the light emitted from the effective dimming area 600A. Therefore, on the screen, there is displayed the projection image 900A corresponding to the state in which the image shown in FIG. 10A and the image shown in FIG. 10B overlap each other. In the case in which the light modulation device 800 is disposed with the relative rotational difference from the dimming device 600, the moire as the bright and dark fringe occurs in the projection image as shown in FIG. 10C even if $f1 = n \times f2$ is fulfilled as described above.

In contrast, the projector 2 according to the present embodiment is provided with the imaging optical system 700 for imaging the light emitted from the effective dimming area 600A at the position shifted from the light modulation device 800, and can therefore inhibit the moire.

FIGS. 11A through 11C are schematic diagrams for explaining the projection image projected from the projector 2 according to the present embodiment, and diagrams in the case of displaying the grid-like image. Specifically, FIG. 11A is a diagram showing the state of the image forming area 800A illuminated by the light emitted from the effective dimming area 600A, FIG. 11B is a diagram showing the display image 800D displayed in the image forming area 800A, and FIG. 11C is a diagram showing the projection image 900B projected on a screen or the like from the projector 2.

Since the light emitted from the effective dimming area 600A is imaged at the position shifted from the light modulation device 800, the shadow of the black matrix provided to the dimming device 600 hardly appears on the image forming area 800A as shown in FIG. 11A. Therefore, the projection image 900B corresponding to the state in which the image shown in FIG. 11A and the image shown in FIG. 11B overlap each other becomes the image in which the moire is suppressed as shown in FIG. 11C even in the case in which the light modulation device 800 is disposed with the relative rotational difference from the dimming device 600.

Further, if the defocus amount is too large, a dully white-tinged halo occurs in an area of an originally black (dark) image, and if the light emitted from the effective dimming area 600A is imaged on the light modulation device 800, there occurs a halo in which the shape of the dimming part for emitting the light in the effective dimming area 600A becomes sharp.

FIGS. 12A through 12C and FIGS. 13A through 13C are schematic diagrams for explaining the fact that the halo Ha occurs in the case in which the configuration is different from that of the projector according to the present embodiment, and diagrams showing the case of displaying an image of a white circle with a black background. Specifically, FIGS. 12A through 12C are diagrams of the case in which the defocus amount is too large, and FIGS. 13A through 13C are diagrams of the case of adopting the configuration in which the light emitted from the effective dimming area 600A is imaged in the image forming area 800A. Further, in FIGS. 12A through 12C and FIGS. 13A through 13C, FIGS. 12A and 13A are diagrams showing the state of the image forming area 800A illuminated by the light emitted from the effective dimming area 600A, FIGS. 12B and 13B are diagrams showing the display image 800D displayed in the image forming area 800A, and FIGS. 12C and 13C are diagrams respectively showing the projection images 900C, 900D.

If the defocus amount is too large as shown in FIG. 12A, on the image forming area 800A, an area having a size greatly exceeding the size of the image of the white circle displayed in the image forming area 800A shown in FIG. 12B is irradiated with the illumination light. As a result, a marked white-tinged halo Ha appears in an area located outside the white circle and intended to be displayed with black color as shown in FIG. 12C.

In the case of adopting the configuration in which the light emitted from the effective dimming area 600A is imaged in the image forming area 800A, the shape of the dimming part in the effective dimming area 600A directly appears on the image forming area 800A as shown in FIG. 13A, and in the projection image 900D, there is displayed the halo Ha in which the shape of the dimming part appears outside the white circle originally intended to be displayed as shown in FIG. 13C.

In contrast, the image projected from the projector 2 provided with the imaging optical system 700 in which the defocus amount is appropriately set as in the present embodiment becomes one with the halo Ha suppressed.

FIGS. 14A through 14C are schematic diagrams for explaining the projection image projected from the projector 2 according to the present embodiment. Specifically, FIG. 14A is a diagram showing the state of the image forming area 800A illuminated by the light emitted from the effective dimming area 600A, FIG. 14B is a diagram showing the display image 800D displayed in the image forming area 800A, and FIG. 14C is a diagram showing the projection image 900E.

If the defocus amount is appropriately set as shown in FIG. 14A, an area smaller than the area shown in FIG. 12A, and having the area approximate to the size of the image of the white circle displayed in the image forming area 800A is irradiated with the light emitted from the effective dimming area 600A on the image forming area 800A as shown in FIG. 14A.

Further, in the projection image 900E, although the white-tinged part is slightly generated outside the white circle as shown in FIG. 14C, the area is small, and the degree of the white tinge is low compared to the halo Ha in the projection image 900C shown in FIG. 12C. Further, compared to the halo Ha in the projection image 900D shown in FIG. 13C, the projection image 900E becomes the image in which the shape of the dimming part does not appear, and which does not cause discomfort when viewed by the observer.

As described above, in the imaging optical system 700, the defocus amount is appropriately set so that the moire and the halo are suppressed.

As described hereinabove, according to the projector 2 of the present embodiment, the following advantages can be obtained in addition to the advantages (1) and (2) in the projector 1 of the first embodiment.

(1) The illumination device 20 is provided with the imaging optical system 700, and makes the light emitted from the effective dimming area 600A enter the image forming area 800A in a defocused state. Since it is possible to appropriately diffuse the light emitted from the effective dimming area 600A to illuminate the image forming area 800A due to this configuration, the image in which the moire and the halo described above are suppressed can be displayed. In particular, in the configuration in which the image forming area 800A is formed at high resolution, a marked effect is obtained.

(2) Since there is no need to accurately dispose the positions of the dimming devices 600 to the light modulation devices 800 (e.g., lessening of the rotational difference described above) compared to the configuration not provided with the imaging optical system 700, manufacturing of the projector 2 can be made easier.

(3) Since the dimming devices 600 and the light modulation devices 800 can be separated from each other, it is possible to easily make the cooling air flow between the dimming devices 600 and the light modulation devices 800 to thereby efficiently cool the dimming devices 600 and the light modulation devices 800. Therefore, the deterioration of the dimming devices 600 and the light modulation devices 800 due to high temperature is suppressed, and it becomes possible to extend the life of the projector 2.

(Modified Example)

It should be noted that the embodiments described above can be modified as follows.

Although in the embodiments described above, there are shown front-type projectors as the display devices, namely the projectors 1, 2 for projecting an image on the screen disposed so as to be opposed to the projectors 1, 2, it is also possible to adopt rear-type projectors provided with a transmissive screen as the display devices.

Although the illumination devices 10, 20 in the embodiments described above are configured so that the light emitted from the light source 111 is modulated by the liquid crystal panel to thereby control the light intensity, it is also possible to adopt a device, which is provided with a solid-state light source capable of controlling the light intensity of the light to be emitted, as the illumination device.

Figure 15:
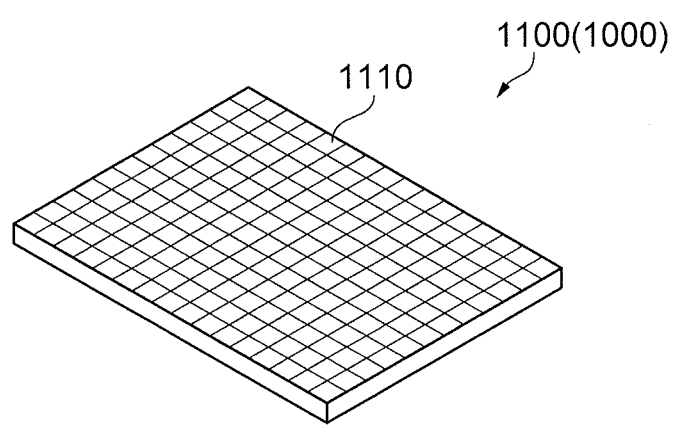
FIG. 15 is a schematic diagram showing an illumination device of a modified example.

FIG. 15 is a schematic diagram showing an illumination device 1000 according to the modified example. As shown in FIG. 15, the illumination device 1000 is provided with a solid-state light source array 1100 having a plurality of solid-state light sources 1110 (e.g., LED (Light Emitting Diodes)) arranged in a plurality of rows and a plurality of columns. The solid-state light sources 1110 each correspond to the dimming part, and the solid-state light source array 1100 has the effective dimming area where the solid-state light sources 1110 are arranged so as to correspond to predetermined pixel groups in the image forming area. Each of the solid-state light sources 1110 is configured so as to individually be controlled in the intensity of the light to emit by, for example, PWM (Pulse Width Modulation) drive, and the light intensity is determined based on the signal representing the display image in the image forming area. Further, the solid-state light source array 1100 is formed so that the position of the peak of the intensity distribution of the light emitted from the dimming part located on the outermost side out of the effective dimming area is located on the outer edge of the image forming area or outside the image forming area.

By providing such an illumination device 1000, an improvement in the contrast ratio is achieved, and the degradation of the luminance in the end parts in the image to be displayed is suppressed, and thus it becomes possible to realize the display device such as a television set or a video monitor capable of displaying a high-quality image in the image forming area.

Although in the embodiments described above, the dimming parts in the effective dimming area, and the pixels in the image forming area are each formed to have a rectangular shape, the shape is not limited to the rectangular shape, but can be, for example, a honeycomb shape.

Further, although the dimming parts are each formed to have the same shape, it is also possible to adopt a configuration having the dimming parts different in shape from each other. For example, it is also possible to adopt a configuration in which the size is different between the center of the effective dimming area and the vicinity of the end part.

Although the projectors 1, 2 according to the embodiments described above each adopt a so-called three-panel system using the three light modulation devices corresponding respectively to the R light, the G light, and the B light, the invention is not limited thereto, but a single-panel system can also be adopted, or the invention can also be applied to a projector provided with two or more than three light modulation devices.

The dimming devices 300, 600 and the light modulation devices 40, 800 of the embodiments described above are configured using transmissive liquid crystal panels, but can also be the devices using reflective liquid crystal panels.

Further, those using a micromirror-type device such as a DMD (Digital Micromirror Device) can also be adopted.

The light source 111 of the embodiments described above uses a discharge lamp, but is not limited to the discharge lamp, and can also be formed of a solid-state light source such as a lamp of other types, a laser, or an LED.

Further, it is also possible to use a plurality of light sources for emitting colored light beams different from each other (e.g., a plurality of LEDs for respectively emitting the three colored light beams) to configure the illumination device so as to simplify the color separation optical systems 200, 500 or so as not to be provided with the color separation optical systems 200, 500.

The entire disclosure of Japanese Patent Application No. 2013-241620, filed Nov. 22, 2013 is expressly incorporated by reference herein.

REFERENCE SIGNS LIST

1, 2 projector
10, 20, 1000 illumination device
30A, 600A effective dimming area
30a, 30ax, 30ay dimming part
40, 800 light modulation device
40A, 800A image forming area
40L illumination area
40a pixel
40b pixel group
60 projection lens
111 light source
300, 600 dimming device
700 imaging optical system
1110 solid-state light source
Lp peak of the intensity of the light

The invention claimed is:

1. A display device comprising:
a light modulation device having an image forming area in which a plurality of pixels are arranged, and adapted to modulate incident light; and
an illumination device adapted to illuminate the image forming area, characterized in that the illumination device has an effective dimming area in which a plurality of dimming parts each capable of individually controlling a light intensity of the light for illuminating the image forming area are arranged, wherein
illumination areas illuminated by the light emitted from the dimming parts adjacent to each other out of the plurality of dimming parts partially overlap each other, and the light enters the light modulation device, and
a position of a peak of an intensity distribution of the light emitted from the dimming part located on an outermost side of the effective dimming area is located one of on an outer edge of the image forming area and outside the image forming area, wherein
the dimming parts are each configured so as to have a same shape, and in a case of defining a length in a first direction of the image forming area as L1, an interval of the peaks of the intensity distributions in the first direction of the light emitted from the plurality of dimming parts as p1, and a number of the dimming parts in the first direction of the effective dimming area as n1, $p1 \times (n1-1) \geq L1$ is fulfilled.

2. The display device according to claim 1, wherein in a case of defining a length in a second direction perpendicular to the first direction of the image forming area as L2, an interval of the peaks of the intensity distributions in the second direction of the light emitted from the plurality of dimming parts as p2, and a number of the dimming parts in the second direction of the effective dimming area as n2, $p2 \times (n2-1) \geq L2$ is fulfilled.

3. The display device according to claim 1,
a light exit side of the plurality of dimming parts and a light incident side of the image forming area are disposed so as to be opposed to each other, and
the effective dimming area is larger than the image forming area in a first direction and a second direction perpendicular to the first direction.

4. The display device according to claim 1,
a light exit side of the plurality of dimming parts and a light incident side of the image forming area are disposed so as to be opposed to each other, and
the effective dimming area is larger than the image forming area in a first direction and a second direction perpendicular to the first direction.

5. The display device according to claim 2,
a light exit side of the plurality of dimming parts and a light incident side of the image forming area are disposed so as to be opposed to each other, and
the effective dimming area is larger than the image forming area in a first
direction and a second direction perpendicular to the first direction.

6. The display device according to claim 1, the illumination device is provided with an imaging optical system adapted to image the light emitted from the effective dimming area at a position shifted from the light modulation device in a direction along an optical axis of the light.

7. The display device according to claim 1, further comprising: a projection optical device adapted to project the light modulated by the light modulation device, wherein the plurality of dimming parts are provided with a light source adapted to emit light, and a dimming device adapted to modulate the light emitted from the light source.

8. The display device according to claim 1, further comprising: a projection optical device adapted to project the light modulated by the light modulation device, wherein the plurality of dimming parts are provided with a light source adapted to emit light, and a dimming device adapted to modulate the light emitted from the light source.

9. The display device according to claim 2, further comprising: a projection optical device adapted to project the light modulated by the light modulation device, wherein the plurality of dimming parts are provided with a light source adapted to emit light, and a dimming device adapted to modulate the light emitted from the light source.

10. The display device according to claim 3, further comprising: a projection optical device adapted to project the light modulated by the light modulation device, wherein the plurality of dimming parts are provided with a light source adapted to emit light, and a dimming device adapted to modulate the light emitted from the light source.

11. The display device according to claim 1, wherein the dimming parts are each a solid-state light source adapted to emit the light so that the light intensity can be controlled, and the illumination device is provided with a solid-state light source array having the solid-state light sources arranged.

* * * * *